(12) United States Patent
Sieper et al.

(10) Patent No.: US 9,023,260 B2
(45) Date of Patent: May 5, 2015

(54) METHOD FOR PRODUCING A SCREW PART WITH AN ANNULAR CROSS-SECTION

(75) Inventors: Günter Sieper, Remscheid (DE); Peik-Christian Witte, Bergisch Gladbach (DE)

(73) Assignee: VOSS Automotive GmbH, Wipperfürth (DE)

( * ) Notice: Subject to any disclaimer, the term of this patent is extended or adjusted under 35 U.S.C. 154(b) by 936 days.

(21) Appl. No.: 12/937,308

(22) PCT Filed: Apr. 9, 2009

(86) PCT No.: PCT/EP2009/054289
§ 371 (c)(1),
(2), (4) Date: Dec. 27, 2010

(87) PCT Pub. No.: WO2009/124994
PCT Pub. Date: Oct. 15, 2009

(65) Prior Publication Data
US 2011/0150602 A1    Jun. 23, 2011

(30) Foreign Application Priority Data
Apr. 12, 2008   (DE) .................. 10 2008 018 514

(51) Int. Cl.
*B29C 45/00* (2006.01)
*B29L 1/00* (2006.01)

(52) U.S. Cl.
CPC ......... *B29C 45/0005* (2013.01); *Y10T 428/139* (2015.01); *B29C 2045/0006* (2013.01); *B29L 2001/00* (2013.01); *B29L 2001/002* (2013.01); *B29C 45/0046* (2013.01); *B29L 2001/005* (2013.01)

(58) Field of Classification Search
None
See application file for complete search history.

(56) References Cited

U.S. PATENT DOCUMENTS

| | | | | |
|---|---|---|---|---|
| 2,901,455 | A | * | 8/1959 | Jurras .............................. 428/76 |
| 2,943,967 | A | * | 7/1960 | Simon ........................... 156/171 |
| 5,083,684 | A | * | 1/1992 | Ebina et al. .................... 222/394 |
| 6,095,570 | A | * | 8/2000 | Hagen et al. ...................... 285/93 |
| 6,998,434 | B2 | * | 2/2006 | Wadahara et al. ............. 524/495 |
| 7,237,810 | B2 | * | 7/2007 | Hollingsworth et al. ..... 285/390 |
| 7,406,891 | B2 | * | 8/2008 | Miyasaka ........................ 74/431 |
| 2004/0241276 | A1 | * | 12/2004 | Miyasaka ..................... 425/543 |
| 2006/0062650 | A1 | * | 3/2006 | Keener .............................. 411/34 |
| 2010/0119299 | A1 | * | 5/2010 | Montminy et al. ........... 403/217 |
| 2011/0150602 | A1 | * | 6/2011 | Sieper et al. .................. 411/378 |

FOREIGN PATENT DOCUMENTS

| | | |
|---|---|---|
| EP | 0 406 011 | 1/1991 |
| EP | 0 913 618 | 5/1999 |
| EP | 1 484 152 | 12/2004 |
| JP | 62-148219 | 7/1987 |

* cited by examiner

*Primary Examiner* — Benjamin Schiffman
(74) *Attorney, Agent, or Firm* — Brinks Gilson & Lione

(57) ABSTRACT

A molded part and a method for producing the molded part. The molded part is rotationally symmetrical or at least partially annular in cross section and formed by a plasticized polymeric mass containing fibers being injected through an injection opening into a cavity of a molding tool. Once the polymeric mass has solidified, the molded part is removed from the tool. Injection into the cavity takes place through at least two injection openings in such a way that the fibers are aligned predominantly in the main stress directions of axial tension and torsion in the molded part.

9 Claims, 15 Drawing Sheets

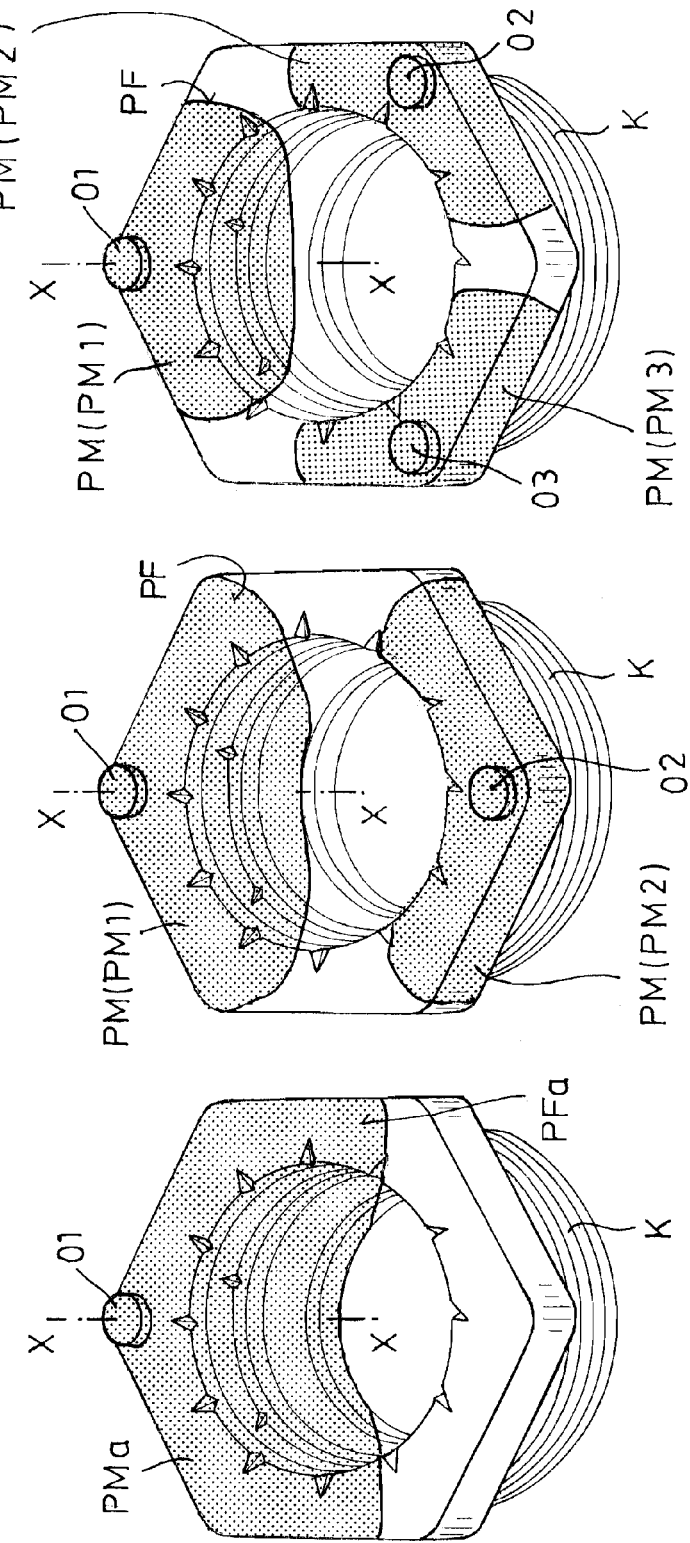

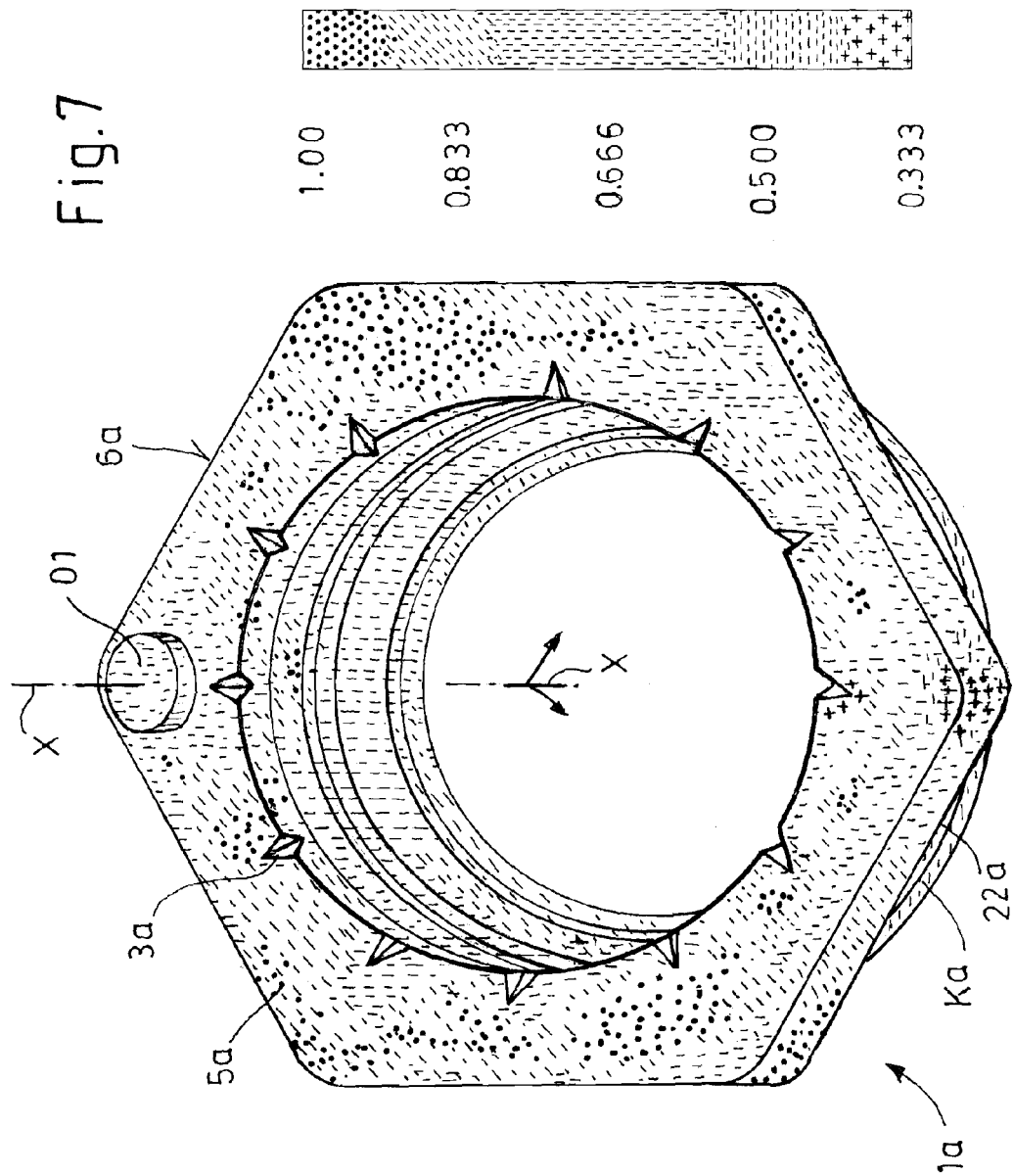

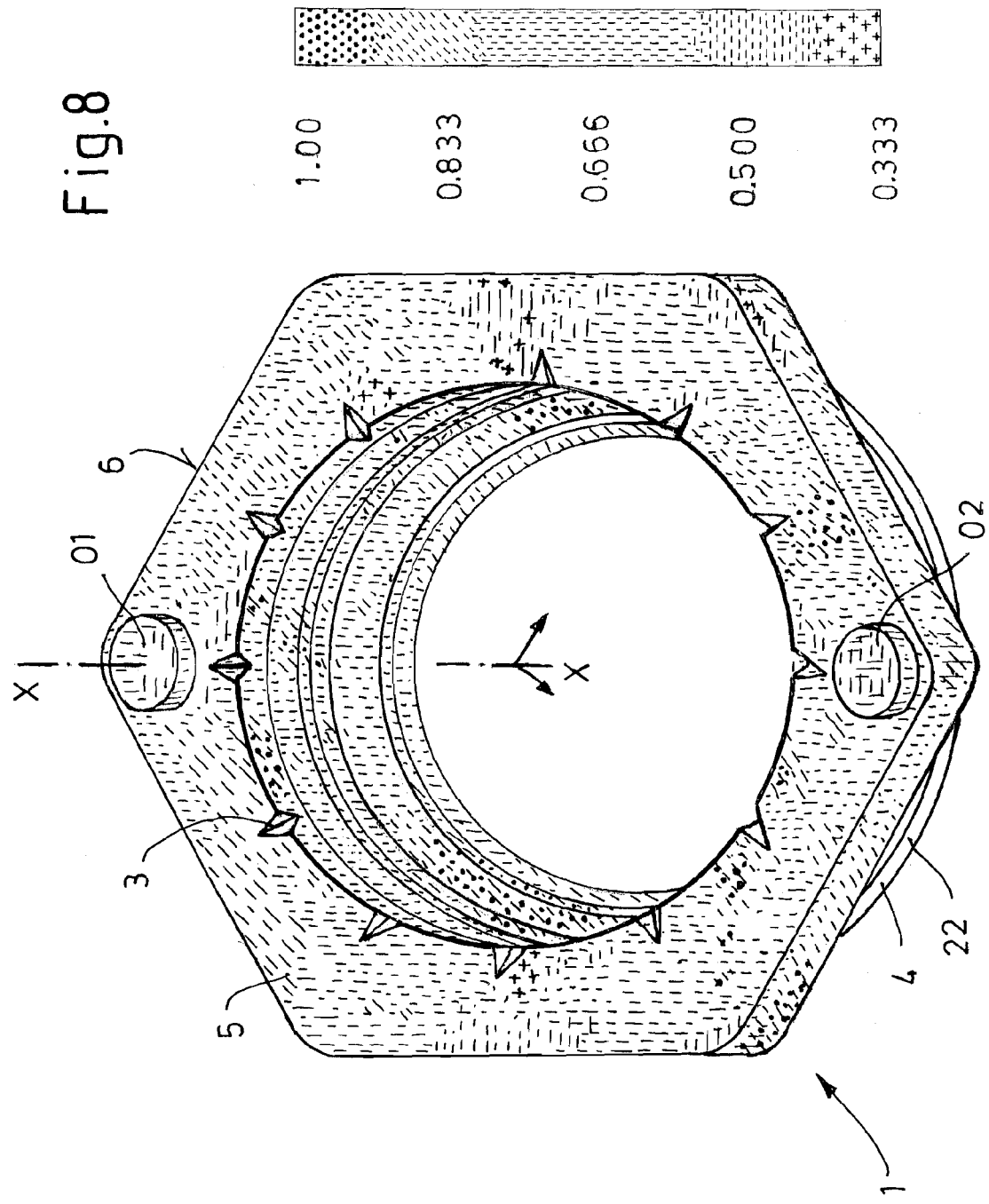

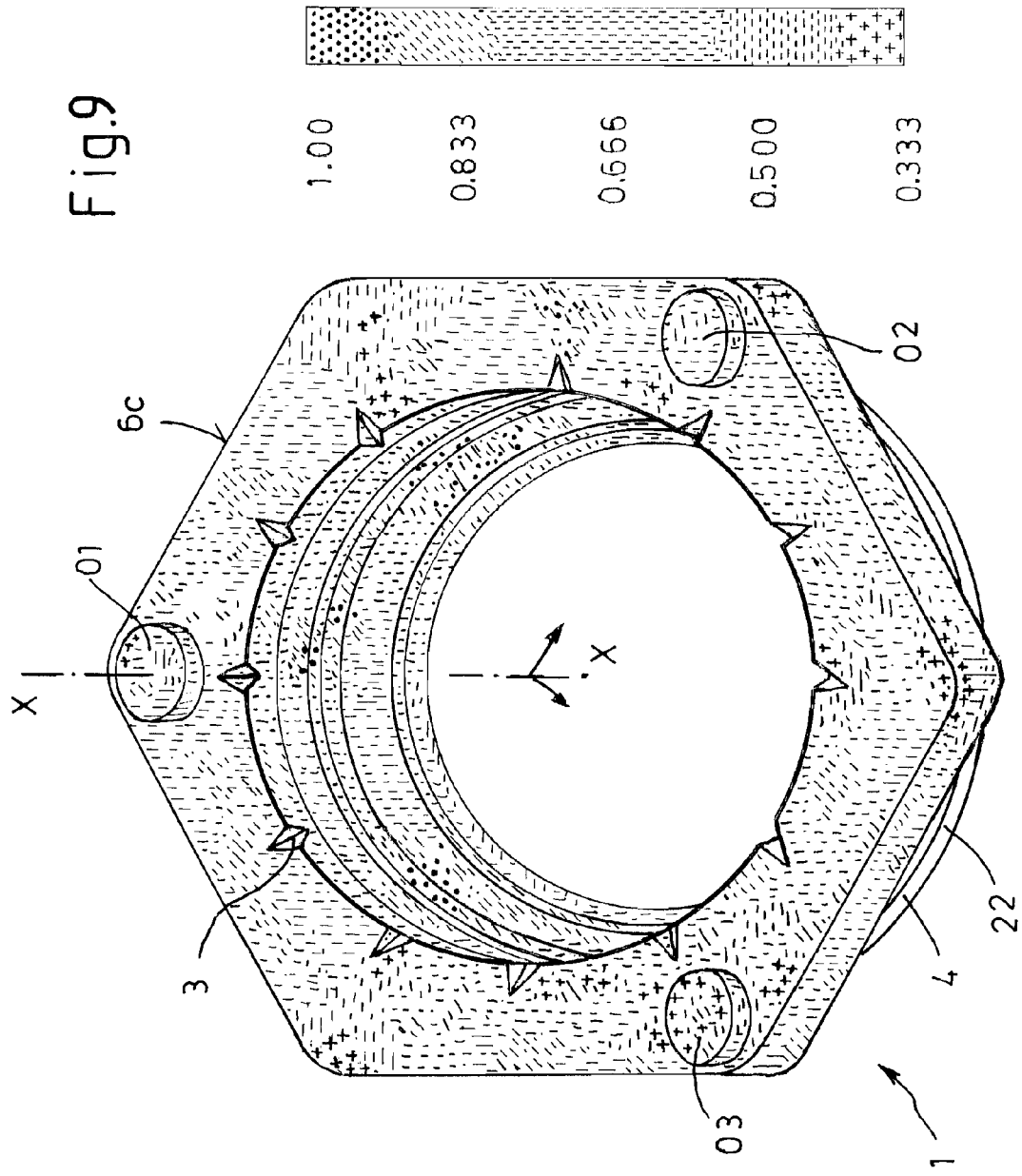

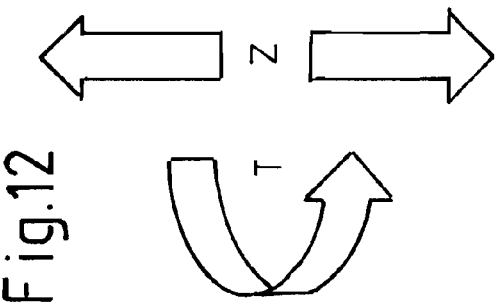
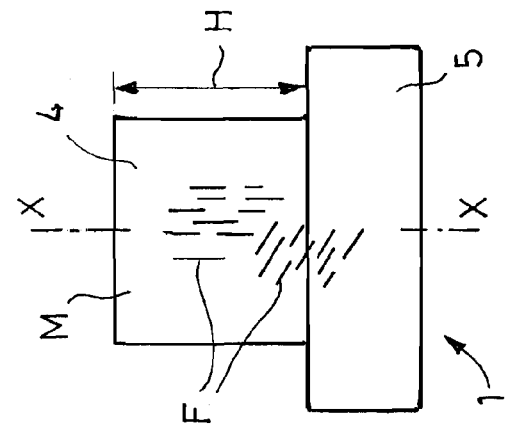
Fig.10
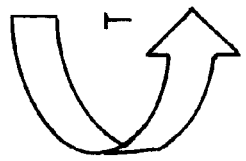
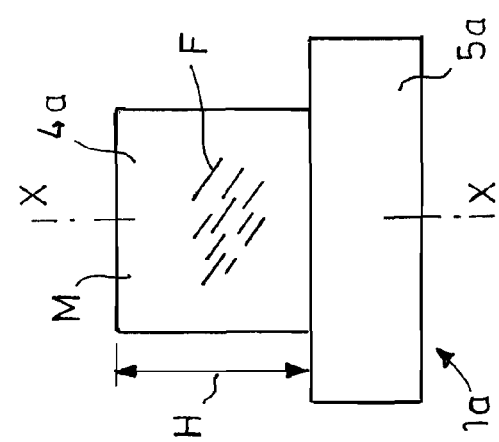
Fig.11
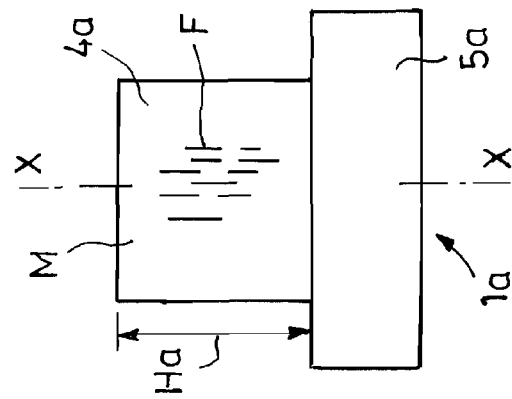
Fig.12

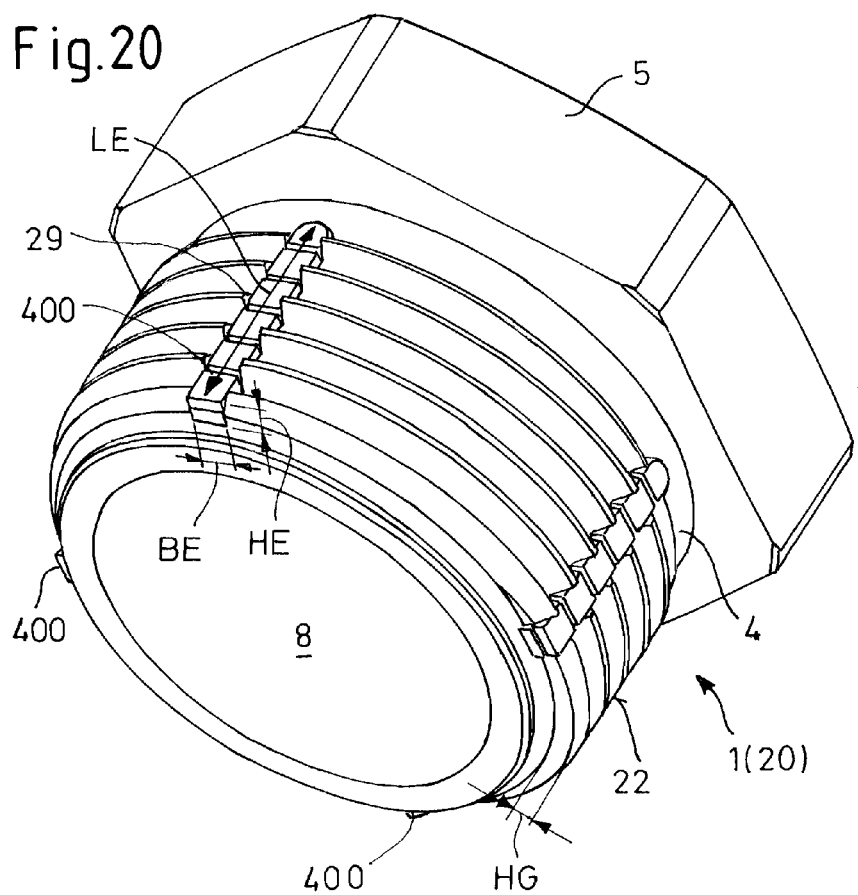
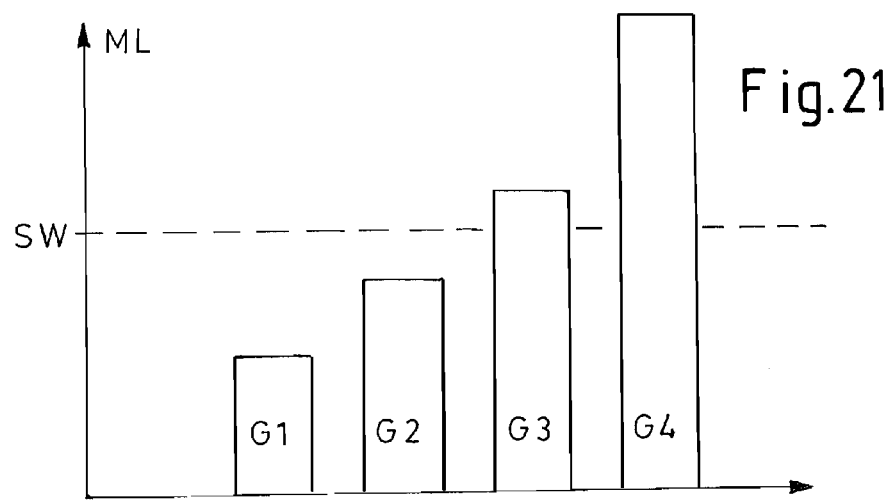

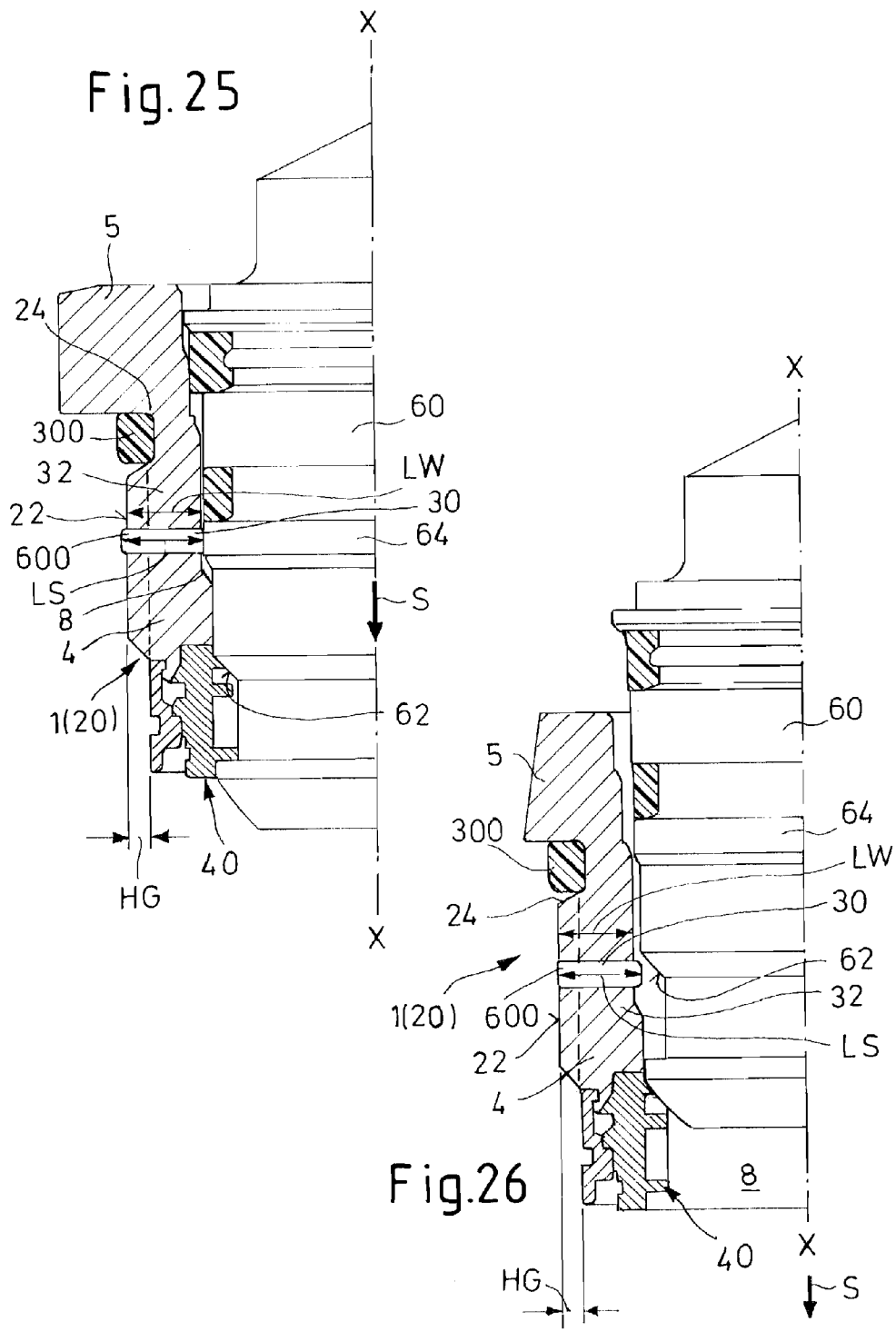

METHOD FOR PRODUCING A SCREW PART WITH AN ANNULAR CROSS-SECTION

FIELD OF THE INVENTION

The present invention relates to a method for producing a molded part with a rotationally symmetrical or at least partially annular cross section, such as a nut, a collar, a pipe connector, a pipe coupling or similar part, whereby a plasticized polymeric mass containing fibers is injected through an injection opening into at least one cavity of a molding tool and, once the polymeric mass has solidified, the molded part is removed from the tool. Moreover, the invention relates to a molded part produced according to a method of this type.

BACKGROUND OF THE INVENTION

Injection molding is a known discontinuous molding method used for plastic materials. Injection molding allows the production of a large quantity of molded parts, with high accuracy, which can immediately be used industrially. For this purpose, the material and/or molding mass is plasticized in an injection unit of an injection molding machine and injected into an injection molding tool. Modern injection molding machines work with a screw conveyer which plasticizes, conveys and injects the molding mass into the tool. The polymeric mass solidifies in the cavity and/or mold cavity of the tool, whereupon the molded part can be removed from the tool. A volume contraction resulting from solidification can basically—however, only to a certain extent—be compensated by a holding pressure applied prior to removal of the part.

Certain thermoplastics, duroplastics and elastomers can be processed by means of injection molding. Using masses containing fibers in injection molding thermoplastics has also been known, whereby molded parts with comparatively higher strength can be produced. During injection molding, the mass temperature is approx. between 100° C. and 350° C., the injection pressure approx. between 400 bar and 1600 bar and the tool temperature approx. between 40° C. and 160° C. When processing thermoplastics, the conveyor screw is relatively warm in order to melt the thermoplastic material. In contrast, the tool is relatively cold in order to cool the just molded part. When processing duroplastics, the temperature of the plasticizing unit has to be adjusted to the flow and cure behavior and is therefore in general lower than for thermoplastics, while the tool has to be kept warmer than the injection unit so that the mass can adequately harden there.

In contrast to calandering, by means of which only plane layers of uniform thickness can normally be produced, in injection molding, the hollow space of the tool, the so-called cavity, determines the shape and superficial structure of the finished part, so that molded parts of the type mentioned above—with rotationally symmetrical or in particular at least partially annular cross section—can be produced in a single operation by injection molding. For this purpose, the plasticized polymeric mass is injected into the cavity through an injection opening, whereby the mass flows in an annular manner around an inner core of the tool, and merges at the side opposite the injection opening. A weld line results at this point, which normally has a lower strength than the remaining body of the molded part.

It is the object of the present invention to provide a method of the type mentioned above, by means of which a molded part with a rotationally symmetrical, in particular, annular, or at least partially annular cross section, such as a nut, a collar, a pipe connector, a pipe coupling or similar part, can be produced with improved strength in the stress direction and, preferably, also controlled shrinkage and warping during solidification of the polymeric mass using simple technology.

SUMMARY

According to the present invention, this object is attained in that injection into the cavity takes place through at least two injection openings in such a way that the fibers are predominantly aligned in the main stress directions of axial tension and torsion in the molded part.

Furthermore, this object is attained according to the present invention in that a proportion of the fibers, which are aligned in the circumferential direction of the annular cross section at right angles to the longitudinal axis of the molded part, is smaller than 50 percent and that another proportion of the fibers, which are aligned in the axial direction of the annular cross section of the molded part, is likewise smaller than 50 percent. The proportion of fibers aligned in the circumferential direction of the cross section at right angles to the longitudinal axis of the molded part is preferably smaller than 30 percent, and the other proportion of fibers aligned in the axial direction of the annular cross section of the molded part is likewise preferably smaller than 30 percent.

The invention is based on the recognition that, against the prevailing opinion that only one weld line has to be provided in a molded part of the type mentioned above because it has less strength than the remaining body of the molded part, by means of the method according to the present invention, molded parts with annular cross section can be provided with higher strength with respect to the stress they are exposed to when used. This is accomplished by controlling the alignment of the fibers in the plasticized polymeric mass in an appropriate and stress withstanding manner by means of injection through at least two injection openings because the fibers, in particular short fibers measuring from 0.1 to 1.5 mm in length, to a large extent, align along the flow lines of the plasticized polymeric mass during injection.

The molded part, according to the present invention, in which a proportion of the fibers are aligned in the circumferential direction of the annular cross section at right angles to the longitudinal axis of the molded part is smaller than 50 percent, preferably smaller than 30 percent, and also another proportion of the fibers which are aligned in the axial direction of the molded part, is likewise smaller than 50 percent, preferably smaller than 30 percent, is optimally predestined for main stress under axial tension and circumferential torsion. These main stresses can occur successively or simultaneously.

The plasticized polymeric mass can contain fibers in the range of 2.5 to 60 percent by volume, preferably in the range of 15 to 50 percent, the fibers in the longitudinal direction having a higher modulus of elasticity and a higher tensile strength than the polymeric matrix material.

According to the present invention, the injection can take place in such a way that in a flat projection of the circumferential surface of a cylindrically hollow base body of the molded part, which has a width corresponding to the length of the base body and a length corresponding to the circumference of the base body, the fibers are situated in at least two, preferably three, approximately similarly configured longitudinal sections of the flat projection with respect to the alignment of the fibers. Each longitudinal section can have in particular a symmetrical configuration with respect to a central axis running parallel to the width of the flat projection and through an injection opening, whereby in the area of the central axis of each longitudinal section and marginal areas of each longitudinal section running parallel to this central axis, the fibers are predominantly, preferably by more than 60 percent, aligned in the direction of the course of the central axis of the longitudinal section. In the marginal areas of each longitudinal section, a weld joint is respectively formed between the portions of the polymeric mass entering from different injection openings. In the areas between the central axis of each longitudinal section and the parallel marginal sections thereto the fibers are predominantly, preferably by more than 60 percent, aligned transversely to the direction of the course of the central axis, which is advantageous with regard to a high strength with main stresses of the molded part under axial tension and circumferential torsion.

The invention can advantageously be used in particular for axially screwable fastening components, such as nuts.

Further advantageous characteristics of the embodiment of the invention are included in the dependent claims and in the following description.

BRIEF DESCRIPTION OF THE DRAWINGS

The invention shall hereinafter be explained in more detail with reference to preferred exemplary embodiments, in which it is shown:

FIG. 4 is a perspective illustration, similar to FIG. 1, of the filling of the cavity of a molding tool for the production of a molded part according to FIG. 1, at a certain moment of an injection molding process.

FIG. 5 is an illustration of the filling of a cavity of the molding tool for the production of a molded part according to the present invention as shown in FIG. 2, at generally the same moment as the injection molding process of FIG. 4.

FIG. 6 is an illustration of the filling of a cavity of the molding tool for the production of a molded part according to the present invention as generally shown in FIG. 3, at the generally same moment of the injection molding process of FIGS. 4 and 5.

FIG. 7 is a perspective illustration of a visualization of the alignment of the fibers in a molded part similar to the type shown in FIG. 1.

FIG. 8 is a perspective illustration of a visualization of the alignment of the fibers in a molded part similar to that seen in FIG. 2.

FIG. 9 is a perspective illustration of a visualization of the alignment of the fibers in a molded part similar to that seen in FIG. 3.

FIG. 10 is a schematic illustration of an optimum alignment of the fibers for stress of a molded part under tension.

FIG. 11 is a schematic illustration of an optimum alignment of the fibers for stress of a molded part under torsion.

FIG. 12 is a schematic illustration of the alignment of the fibers in a molded part according to the present invention.

FIG. 20 is a perspective illustration of another embodiment of a molded part according to the present invention and configured as a screw part.

FIG. 21 is a comparative schematic illustration of loose torques, which have different embodiments of a molded part according to the present invention configured as screw parts, when a screw connection of the respective molded part is loosened with another part.

FIGS. 25 and 26 are also partial longitudinal sections of other embodiments of a molded part according to the present invention and configured as screw parts, as well as for the production of plug connections.

DETAILED DESCRIPTION

Figure 3:
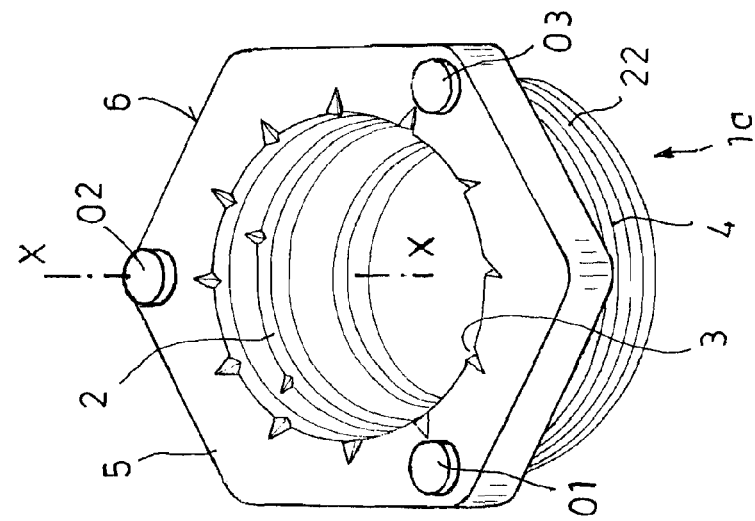
FIG. 3 is an illustration, similar to that seen in FIG. 2, of a second embodiment of a molded part according to the present invention and that can be produced in accordance with an injection molding method of the invention.

In the different figures of the drawings, similar parts are provided with the same reference numerals so that they are normally described only once and need not be repeatedly described throughout this description.

Figure 1:
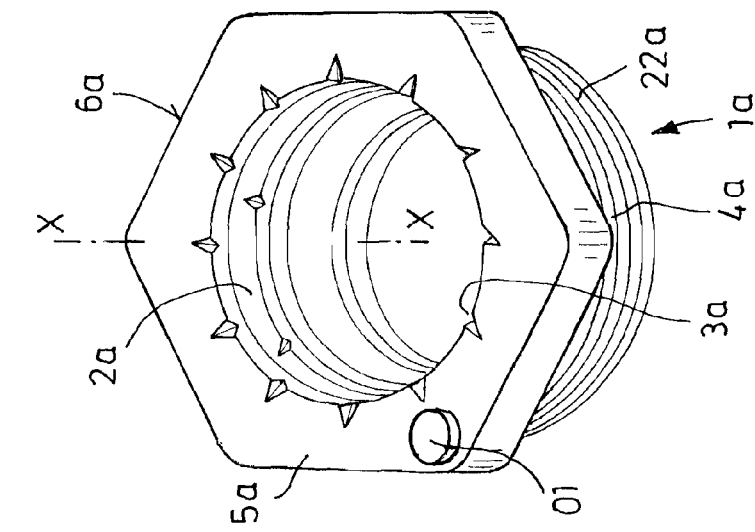
FIG. 1 is a perspective illustration of a known molded part with annular cross section, in particular a nut, which can be produced according to a molding injection method.

FIG. 1 shows a known molded part 1a with annular cross section, in particular a nut, as a comparative example, and which can be produced by an injection molding method of the known type. FIGS. 4, 7, 13 and 15 also refer to this known part.

Figure 2:
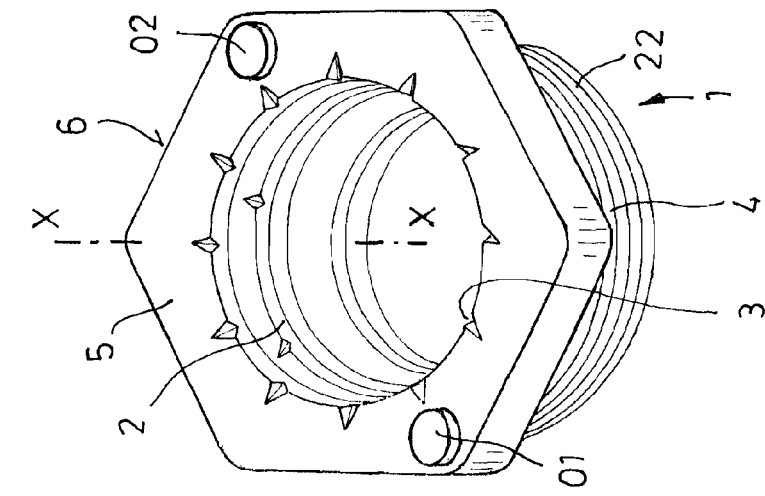
FIG. 2 is an illustration, similar to that seen in FIG. 1, of a first embodiment of a molded part according to the present invention and that can be produced according to an injection molding method of the invention.

FIG. 2 shows a first embodiment of a molded part 1 according to the present invention. The molded part 1 has the same spatial shape as the molded part 1a illustrated as the comparative example. The molded part 1 can be produced by an injection molding process of the type according to the present invention. FIGS. 5, 8, 12 and 16 further refer to this embodiment.

FIG. 3 shows a second embodiment of a molded part 1 according to the present invention, which has the same spatial shape as the molded part 1a illustrated as a comparative example and as the first embodiment of the molded part 1 according to the present invention. This molded part 1 can be produced with an injection molding process of the type according to the present invention. FIGS. 6, 9, 12, 14 and 17 also refer to this embodiment.

The molded parts 1a, 1 illustrated in FIG. 1 to FIG. 3 are molded parts formed of a polymeric matrix which has fibers embedded therein. The fibers are designated with the reference letter F in FIGS. 10 to 12.

For the production of these molded parts 1, 1a, a plasticized polymeric mass containing the fibers F is injected through an injection opening into a cavity of the molding tool, and once the polymeric mass has solidified, the molded part is removed from the tool. The hollow space, the cavity, which is generally indicated in FIGS. 4 to 6 and designated with the reference letter K, determines the shape and surface structure of the finished part 1a, 1. The polymeric mass is designated with the reference abbreviations PMa and PM in these figures.

In the known molded part 1a, injection takes place, as shown in FIG. 1 and also in FIG. 4, into the cavity K through a single injection opening O1.

According to the invention, injection into the cavity K takes place through at least two, and preferably three, injection openings O1, O2, O2, namely in such a way that the fibers predominantly align according to the main stress directions of axial tension and torsion of the molded part 1, which will hereinafter be explained in detail with reference to FIGS. 8, 9, 11 and 14. The main stress directions are symbolized with arrows in FIGS. 10 to 12 and designated with the reference letters Z for tension and T for torsion.

As shown in FIGS. 1 to 3, at least one internal thread 2a, 2, at least one external thread 22a, 22 and/or inner recesses, such as the illustrated notches 3a, 3, outer recesses, such as circumferential grooves and/or inner steps or outer steps, such as radial projections or recesses can be configured on the molded parts 1a, 1.

The molded parts 1a, 1 have a base body 4a, 4, each shaped as a hollow cylinder, which has a longitudinal axis designated with the reference symbol X-X. At the end of the base body 4a, 4 is formed a radially flared flange hub 5a, 5, which is optionally shown as having a hexagonal outer contour 6a, 6 for engaging a tool. The hollow cylinder could for example also have a round, trilobular or other polygonal outer contour, if desired.

According to the first embodiment of the invention, it is provided, as shown in FIGS. 2 and 5, that injection into the cavity K takes place through two injection openings O1, O2, which are situated diametrically opposite one another.

According to the second embodiment of the invention, it is provided, as shown in FIGS. 3 and 6, that injection into the cavity K takes place through three injection openings O1, O2, O3, which are circumferentially offset by 120° from one another on the annular cross section of the molded part 1.

For the production of a molded part 1 according to the present invention, the plasticized polymeric mass PM can be a resin which forms a duroplastic matrix of the molded part 1. A matrix of this type is designated with the reference letter M in FIGS. 10 to 12.

As resins for creating a duroplastic matrix M, epoxy resins (EP), unsaturated polyester resins (UP), vinyl ester resins (VE), phenol-formaldehyde resins (PF), diallyl-phthalate resins (DAP), methacrylate resins (MMA), polyurethanes (PUR), amino and/or in particular melamine resins (MF/MP), or urea resins (UF) can be used in particular.

A molded part 1 with a duroplastic matrix M cannot be remolded once the matrix M has solidified or cured. Nevertheless, they have a large temperature range and maximum strength. This especially applies to hot curing systems which are solidified at high temperatures. The temperature limit will thereby be determined by the glass transition temperature.

For the production of a molded part 1 according to the present invention, the plasticized polymeric mass PM can alternatively be a plastic material which forms a thermoplastic matrix M of the molded part 1. In such a case, basically all thermoplastics normally used for constructive purposes can be employed. It is, however, especially advantageous if the plasticized polymeric mass PM is a polyetherketone (PEEK), a polyphene sulfide (PPS), a polysulfone (PSU), a polyarylamide (PARA), a polyphthalamide (PPA), a polyetherimide (PEI), a polyethylene phthalate (PET), a polyoxymethylene (POM) or a polybutylene terephthalate (PBT).

Fiber reinforced plastic materials with a thermoplastic matrix M can be subsequently remolded or welded. The molded parts 1 are ready for use once the matrix M has cooled, but can soften at increased temperature. The creep tendency decreases with an increasing content of the fibers F. The advantage of the thermoplastic materials mentioned, as preferred in particular, consists of a high matrix strength and applicability under high thermal stress.

As fibers F, isotropic fibers, such as glass fibers, as well as anisotropic fibers, such as carbon fibers, can be used. The plasticized polymeric mass PM contains fibers F in the range of 2.5 to 60 percent by volume, preferably in the range of 15 to 50 percent by volume.

The fibers F have an average length in the range of 0.1 mm to 1.5 mm, and more preferably in the range of 0.3 to 0.7 mm. They are so-called short fibers or short cut fibers which can be directly processed with an extruder, whereby also thermoplastic granulates, which already contain a desired fiber volume fraction and/or fiber mass percentage of short fibers, can be used.

The average diameter of the fibers F is in the range of about 3 to 35 μm, and more preferably in the range of about 5 to 15 μm.

Anisotropic fibers, in particular carbon fiber, are used when high strength and rigidity by mass are required. In the case of carbon fibers, which normally have a diameter of about 5 to 8 μm and are nowadays predominantly made of polyacrylonitrile, the strength and rigidity are substantially higher in the direction of the fiber than transversely to the fiber direction. The fibers are essentially characterized by a high tensile strength.

According to the present invention, it can also be provided that aramid fibers are used as the fibers F. As generally defined aramids or aromatic polyamides are long-chain polyamides in which at least 85 percent of the amide groups are linked to two aromatic rings. Similarly to carbon fibers, aramid fibers also have a negative coefficient of thermal expansion, i.e. become shorter with heating. Their specific strength and modulus of elasticity is lower than those of carbon fibers. Combined with the positive expansion coefficient of the material of the matrix M, dimensionally stable molded parts 1 can, however, be produced. Compared to carbon fiber-containing molded parts 1, the compressive strength of molded parts 1 of this type is, however, lower.

FIGS. 4, 5 and 6 each show an illustration of the filling of a cavity K of a molding tool for the production of a known molded part 1a and/or a molded part 1 according to the present invention at a certain moment of the injection molding process. As seen therein, the cavity K is shown with the mold itself omitted.

In particular, a total injection time of 1.3 s was used at a temperature of the polymeric mass PM of approx. 340° C. and a tool temperature of approx. 145° C., which was followed by a cooling time of 20 s. As the thermoplastic material, Fortron® 1140 L4, a polyphenylene sulfide (PPS) from Ticona, was used and contained 40 percent glass fibers. Besides the already described advantages, a material of this type also has a high chemical resistance to fuels, motor oils as well as to brake and cooling fluids as used in the automotive industry.

It can be seen that the injection openings O1, O1 and O2 and/or O1, O2 and O3 are each arranged in the area of one end of the molded parts 1a or 1 to be produced. In particular, the injection openings are in the area of the end-sided radially flared flange hub 5a and/or 5. In these embodiments, injection of the polymeric mass PM takes place through the injection openings O1, O2 and O3 in the axial direction X-X. Depending on the number of injection openings O1, O1 and O2 and/or O1, O2 and O3, the polymeric mass PMa is available either as a single closed block PMa, as known, or is formed according to the present invention by portions of PM1 and PM2 and/or PM1, PM2 and PM3 of the polymeric mass entering from the different injection openings O1 and O2 and/or O1, O2 and O3, respectively. During injection, the polymeric mass PMa, PM respectively fills the cavity K by simultaneously flowing in the axial direction X-X and to two sides in the circumferential direction. Filling the cavity in this manner is also called frontal flow. At the end of the injection process the whole cavity K is filled with the polymeric mass PMa, PM. This respectively results in the flow lines 7a, 7 seen in FIGS. 13 and 14.

Figure 13:
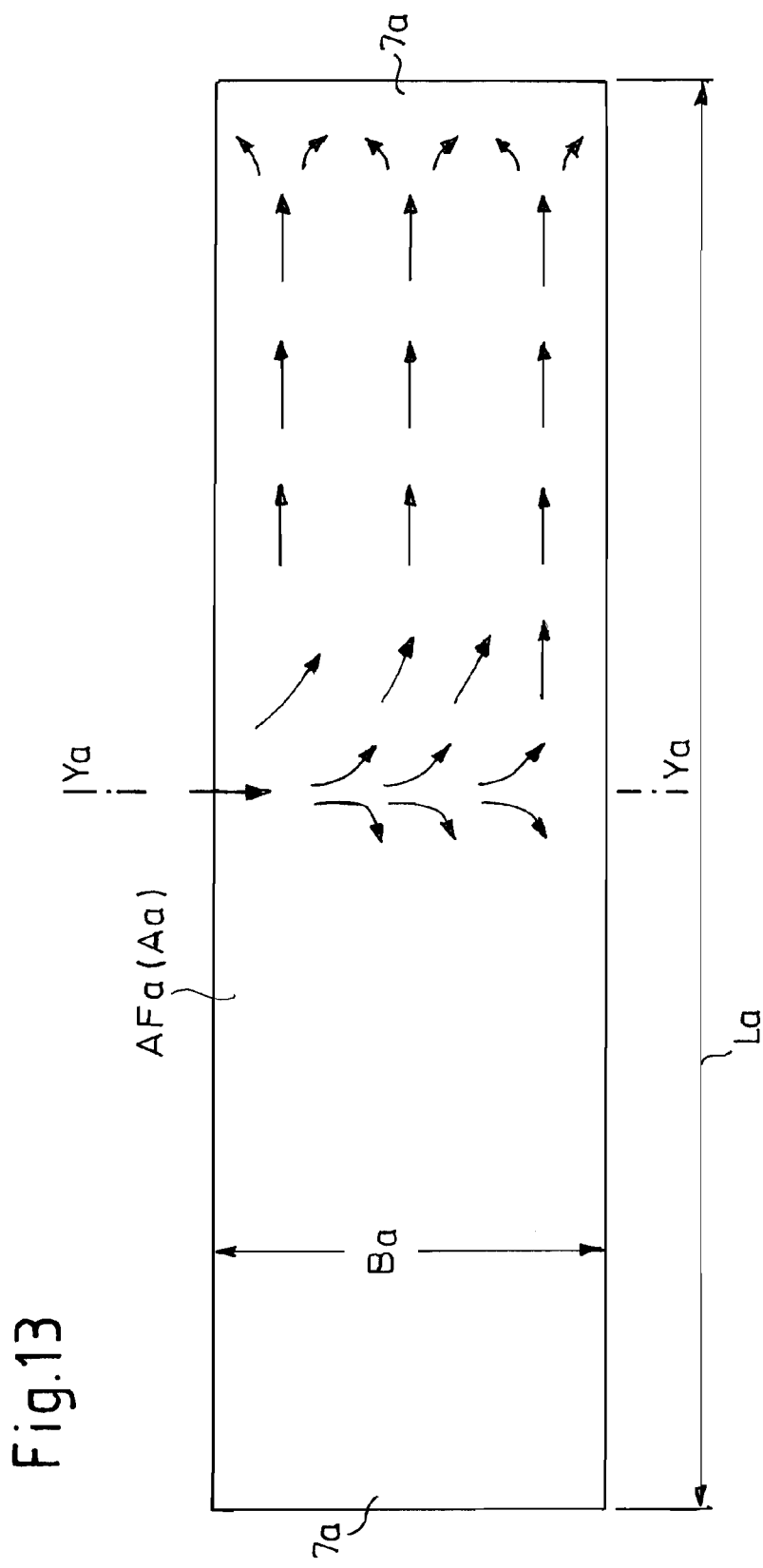
FIG. 13 is a schematic visualization of the alignment of the fibers in a flat projection of the circumferential surface of a cylindrically hollow base body of a molded part according to FIG. 1.

In the comparative molded part 1a, a single flow line 7a results which is drawn in FIG. 13 and situated diametrically opposite to the injection opening O1.

In the first embodiment of the invention, two flow lines 7 result and are each in particular circumferentially offset by 90° from the injection openings O1, O2, i.e., they are situated, like the two injection openings O1, O2, diametrically opposite to one another.

Figure 14:
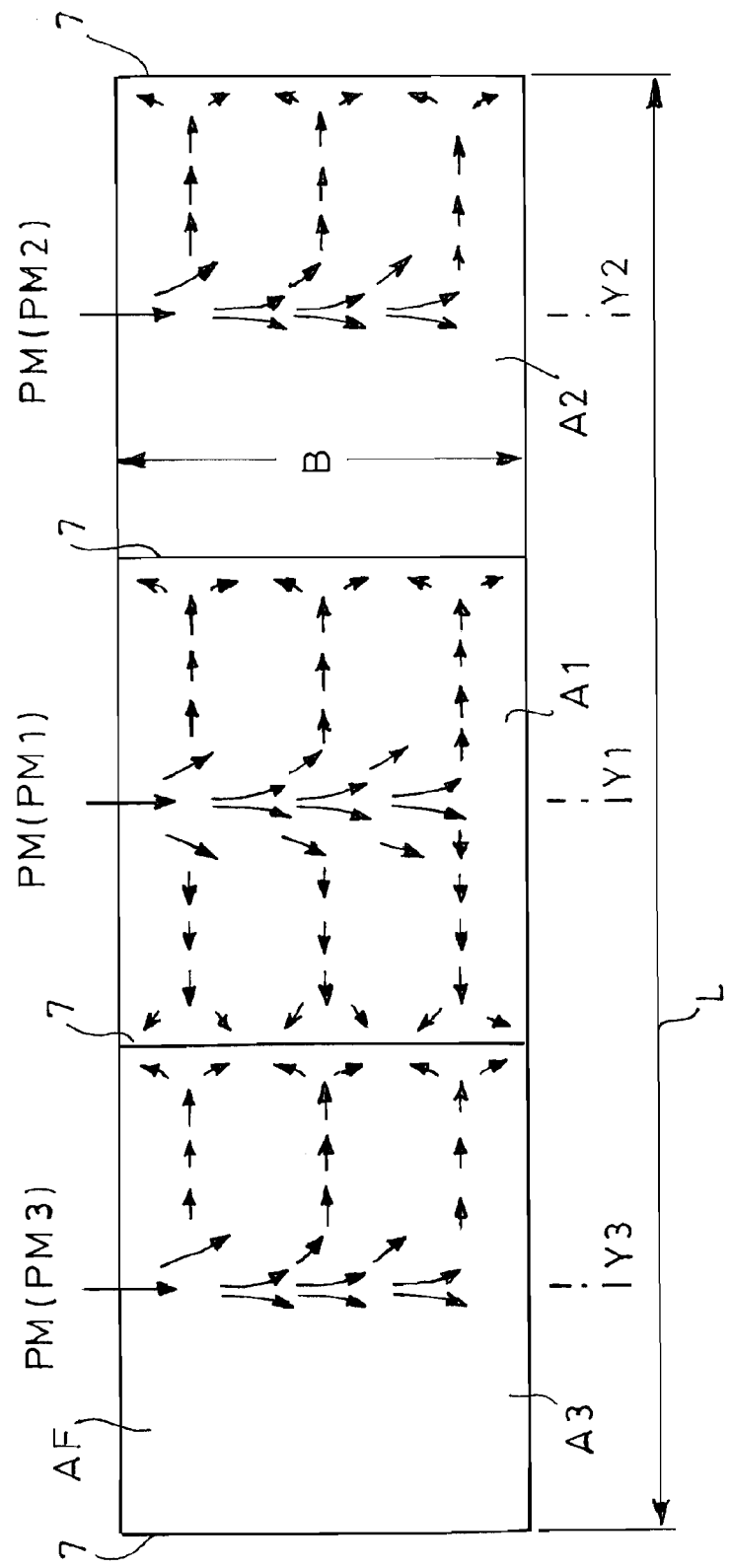
FIG. 14 is a schematic visualization of the alignment of the fibers in a flat projection of the circumferential surface of a cylindrically hollow base body of a molded part according to FIG. 3.

In the second embodiment of the present invention, three flow lines 7 result are drawn in FIG. 14 such that each is, in particular, circumferentially offset by 60° from the injection openings O1, O2, O3, i.e., they are situated, like the injection openings O1, O2, O3 on the annular cross section of the molded part 1, circumferentially offset by 120° from one another.

The polymeric mass PMa, PM flows ahead into the cavity K with a flow front PFa, PF. It solidifies in a direction progressing away from the tool wall toward a core situated inside the mass. While this core is still pasty, it shrinks, leading to a volume contraction, but is also compensated by additional polymeric mass PMa, PM which is further pressed in through the injection openings O1, O2, O3. In this connection, it should be ensured that the technological parameters, such as temperature, pressure and injection volume, for example, are optimized so that no fusing defects at the respective weld lines 7a, 7 are caused during cooling by, for example, too viscous, because too cold, polymeric mass PMa, PM, the cavity K forming mold, an incorrect mass composition, etc.

In this context it has proved effective, if, according to the present invention, the injection through all injection openings O1, O2, O3 takes place with respectively the same technological parameters, such as, for example, temperature, pressure and injection volume. This way, a homogeneous temperature distribution in the polymeric mass PM and also the above described symmetrical configuration of the weld lines 7 is ensured to the greatest possible extent.

During injection, the fibers F align along the flow lines of the plasticized polymeric mass PMa, PM. This is in particular exemplified by FIGS. 7, 8 and 9, each of which reproduce visualizations of the alignment of the fibers F in the different molded parts 1a, 1.

For this purpose, a so-called fiber alignment tensor is specified which indicates to what extent the longitudinal direction of the fibers is identical to the flow direction of the polymeric mass PMa, PM. A scale for the alignment of the fiber alignment tensor going from 0.333 to 1.000 is shown in the right part of the drawing and symbolized by graphic patterns. The upper value (dots) means that the alignment of the fibers is identical to the flow direction of the polymeric mass PMa, PM, the lower value (crosses) states that the alignment of two thirds of the fibers deviates from the flow direction of the polymeric mass PMa, PM. Intermediate values 0.850 (oblique lines), 0.666 (vertical lines) and 0.5 (horizontal lines) state that the fibers F are respectively aligned 85 percent, 66.6 percent and/or 50 percent in the flow direction of the polymeric mass PMa, PM.

By comparing the illustration in FIG. 7 to the illustrations in FIGS. 8 and 9, it is evident that the fibers F of the molded parts 1 according to the present invention deviate more from the flow direction of the polymeric mass PM than the fibers F of the comparative molded part 1a. This exemplifies the existence of the desired alignment of the present invention, namely, that the fibers F are predominantly aligned in the main stress directions of axial tension Z and torsion T in the molded part. The latter will hereinafter be explained in more detail with reference, on the one hand, to FIGS. 10 to 12 as well as, on the other hand, to FIGS. 13 and 14, and is especially important for fastening elements that can be screwed in the axial direction and subject to these stresses while screwing. At the same time, FIGS. 7, 8 and 9, however, also show that the alignment of the fibers F is unidirectional in large areas, i.e. fibers F adjacent to one another only slightly deviate from one another in their alignment.

In the molded part 1a, which is not in accordance with the present invention, the alignment of the fibers F to the greatest extent follows the flow lines of the polymeric mass PMa, as shown in FIG. 7. A high proportion of areas can be seen, in particular, in which the deviation of the alignment of the fibers F from the flow lines of the polymeric mass PMa is nearly zero (dotted areas) or less than 15 percent (areas with oblique lines). Areas with a higher deviation of the alignment of the fibers from the flow lines are proportionally small. A proportion of the fibers F, which are aligned in the circumferential direction of the annular cross section nearly at right angles to the longitudinal axis X-X of the molded part 1a, which is not in accordance with the present invention, is greater than 50 percent in some areas, and a proportion of fibers, which are approximately aligned in the axial direction X-X of the molded part 1a, is likewise greater than 50 percent in some areas.

In the molded parts 1 according to the present invention, the alignment of the fibers F generally deviates, as shown in FIGS. 8 and 9, in the range of 0 to 70 percent, preferably in the range of approximately 15 percent (areas with vertical lines) to 50 percent (areas with horizontal lines) from the course of the flow lines of the polymeric mass PM. A proportion of fibers F, which are aligned in the circumferential direction of the cross section, at right angles to the longitudinal axis X-X of the molded part 1 according to the present invention, is smaller than 50 percent in all areas. Another proportion of fibers, which are approximately aligned in the axial direction X-X of the molded part 1, is likewise smaller than 50 percent. Preferably, a proportion of fibers F, which are aligned in the circumferential direction of the cross section at right angles to the longitudinal axis X-X of the molded part 1 according to the present invention, is smaller than 40 percent, especially preferably smaller than 30 percent. These preferences also apply to another proportion of fibers F, which are aligned in the axial direction X-X of the molded part 1 according to the present invention.

FIG. 10 shows that there is an optimal alignment of the fibers F for a single (not provided according to the present invention) main stress for axial tension Z when all fibers F are aligned in the axial direction X-X of the annular cross section of a molded part 1a. This alignment is, however, the most disadvantageous with regard to a single (likewise not provided according to the present invention) main stress for torsion T because force is then applied transversely to the alignment of the fibers.

FIG. 11 instead shows that there is an optimum alignment of the fibers F for a single (not provided according to the present invention) main stress for circumferential torsion when all fibers F are aligned in the circumferential direction of the annular cross section transversely to the longitudinal axis X-X of the molded part 1 according to the present invention. This alignment is, however, disadvantageous with regard to a single (as mentioned, not provided according to the present invention) main stress for axial tension T because, with axial tension Z, force is then applied transversely to the alignment of the fibers.

The existence of the alignment of the fibers F according to the present invention is exemplified in FIG. 12, namely that the alignment of the fibers is specifically adjusted by the combination of the alignments illustrated in FIGS. 10 and 11 with respect to the stress caused by the force applied on axial tension Z, as well as on torsion T. Accordingly, there are areas whose alignment of the fibers is advantageous with respect to the axial tensile stress, as well as areas where the alignment of the fibers is advantageous with respect to the circumferential torsion. This is accomplished by the corresponding injection into the cavity K through at least two, preferably three, or also more, injection openings O1, O2, O3. This is also apparent from the comparison of the illustrations in FIGS. 13 and 14.

FIG. 13 shows the alignment of the fibers in a flat projection of the circumferential surface AFa of the hollow cylindrical base body 4a of the comparative molded part 1a according to FIG. 1, with arrows which are only drawn in the right half of the figure and not specified in more detail. It can be seen that injection takes place in such a way that in the flat projection of the circumferential surface AFa of the hollow cylindrical base body 4a of the molded part 1a, the fibers F are situated in a single longitudinal section Aa of the flat projection. The flat projection AFa has a width Ba corresponding to the height Ha of the base body 4a (shown in FIG. 10) and a length La corresponding to the circumference of the base body 4a.

With respect to a central axis Ya-Ya running parallel to the width Ba of the flat projection and through the single injection opening O1, the longitudinal axis Aa has a symmetrical configuration with respect to the alignment of the fibers F. In the area of the central axis Ya-Ya of the longitudinal section Aa and in both marginal areas 7a of the longitudinal section Aa running parallel to this central axis, the fibers F are aligned predominantly, preferably above 80 percent, as indicated by the arrows and shown in FIG. 7, in the direction of the course of the central axis Ya-Ya. The weld line 7a is formed, as already mentioned, by the marginal areas 7a of the longitudinal section Aa, namely by the block of the polymeric mass PMa which divides in the cavity K into two flows behind the injection opening O1, and again flow together in the area of the weld line 7a. In the areas between the central axis Ya-Ya and the marginal areas 7a of the longitudinal section Aa, the fibers are predominantly, preferably above 90 percent, aligned at right angles to the direction of the course of the central axis Ya-Ya. One, as well as the other, alignment of the fibers F is a disadvantageous alignment of the fibers, particularly considering that the respective areas aligned in such a way between the central axis Ya-Ya and the marginal areas 7a are proportionally large, as illustrated by means of FIG. 10, in particular with regard to the stress induced by the molded part.

FIG. 14 shows the alignment of the fibers, in a flat projection of the circumferential surface AF of the hollow cylindrical base body 4 of the molded part 1 according to the present invention of FIG. 3, by means of the arrows which are not specified in more detail. It can be seen that the injection takes place in such a way that in the flat projection of the circumferential surface AF of the hollow cylindrical base body 4 of the molded part 1, the fibers F are situated in three longitudinal sections A1, A2, A2 of the flat projection. The flat projection F in turn has a width B corresponding to the height H of the base body 4 (shown in FIG. 12) and a length L corresponding to the circumference of the base body 4. The three longitudinal sections A1, A2, A3 are configured in approximately the same manner with respect to the alignment of the fibers F.

With respect to the central axes Y1-Y1, Y2-Y2, Y3-Y3 running parallel to the width B of the flat projection and respectively through the injection openings O1, O2, O3, each longitudinal section A1, A2, A3 has a symmetrical configuration with respect to the alignment of the fibers F. It should be noted that in the area of the central axes Y1-Y1, Y2-Y2, Y3-Y3 of each longitudinal section A1, A2, A3 and the marginal areas 7 running parallel to these central axes, the fibers F are aligned approximately 40 to 80 percent in the direction of the course of the central axes Y1-Y1, Y2-Y2, Y3-Y3 of the respective longitudinal section A1, A2, A3, as is also apparent from FIG. 9. The marginal areas 7 of each longitudinal section A1, A2, A3 respectively form a weld line 7 between the portions PM1, PM2, PM3 of the polymeric mass PM (s. FIG. 6) entering from the different injection openings O1, O2, O3.

In the areas between the central axis Y1-Y1, Y2-Y2, Y3-Y3 of each longitudinal section A1, A2, A3 and the marginal areas 7 parallel thereto, the fibers F are predominantly, preferably above 60 percent, aligned transversely to the direction of the course of the central axes Y1-Y1, Y2-Y2, Y3-Y3 of the longitudinal sections A1, A2, A3 and thus also aligned with respect to the course of the parallel longitudinal axis X-X of the molded part 1. This alignment of the fibers F is, as was illustrated by means of FIGS. 11 and 12, a very advantageous alignment of the fibers.

This advantage is additionally reinforced in that in the molded part 1 according to the present invention, as shown in FIGS. 8, 9, 11 and 12, a volume ratio of the areas in which the fibers F are predominantly aligned transversely to the direction of the course of the longitudinal axis X-X, to the areas in which the fibers F are predominantly aligned in the direction of the course of the longitudinal axis X-X, can be created which is greater than 1, preferably greater than 2, especially preferably greater than 3. A proportion of fibers F which are aligned in the axial direction X-X of the molded part 1 according to the present invention is smaller than 30 percent.

Another, in particular technological advantage of the invention is that the pressure required for filling the cavity K to a hundred percent decreases with an increasing number of injection openings O1, O2, O3. Thus, the pressure required for the molded part 1a illustrated in FIG. 1 was approximately 1.06 MPa, for the molded part 1 according to FIG. 2 only approximately 0.94 MPa and for the molded part according to FIG. 3 approximately 0.80 MPa. Moreover, the temperature difference at the flow fronts PFa, PF of the polymeric mass PMa, PM decreases at the respectively same injection volume when they meet for forming the weld line 7a, 7. According to the present invention, this results in a better coalescence of the polymeric mass PM with a higher seam strength which has an incremental effect on the total strength of the part.

Figure 15:
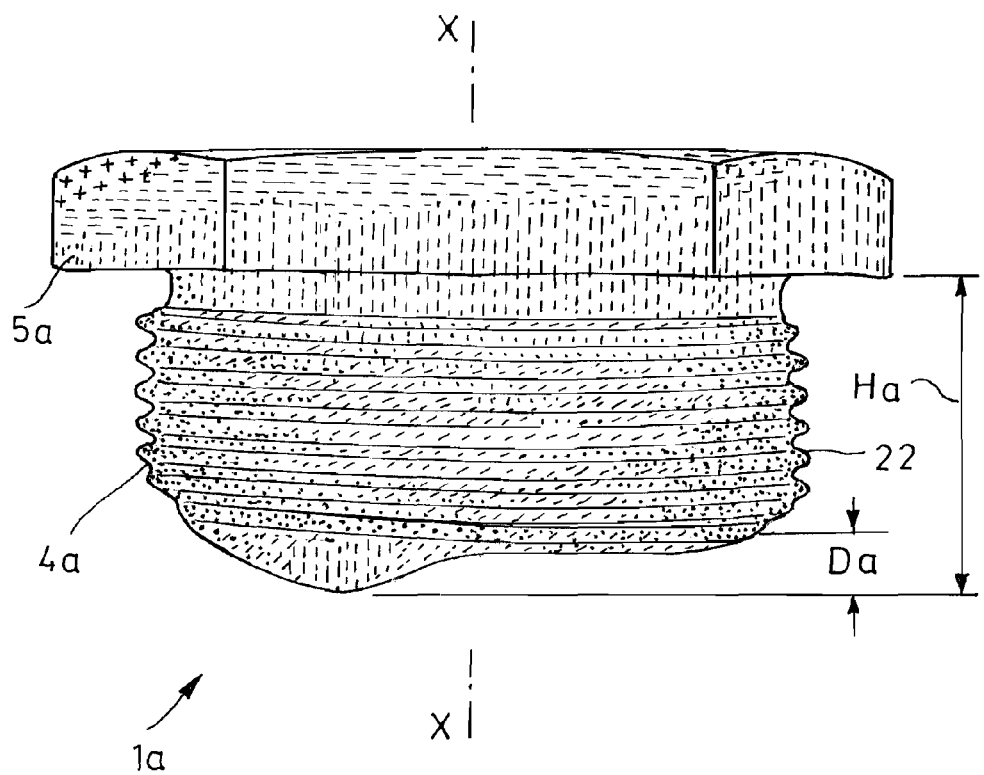
FIG. 15 is an illustration of shrinkage and warping in the longitudinal direction in a molded part according to FIG. 1.
Figure 16:
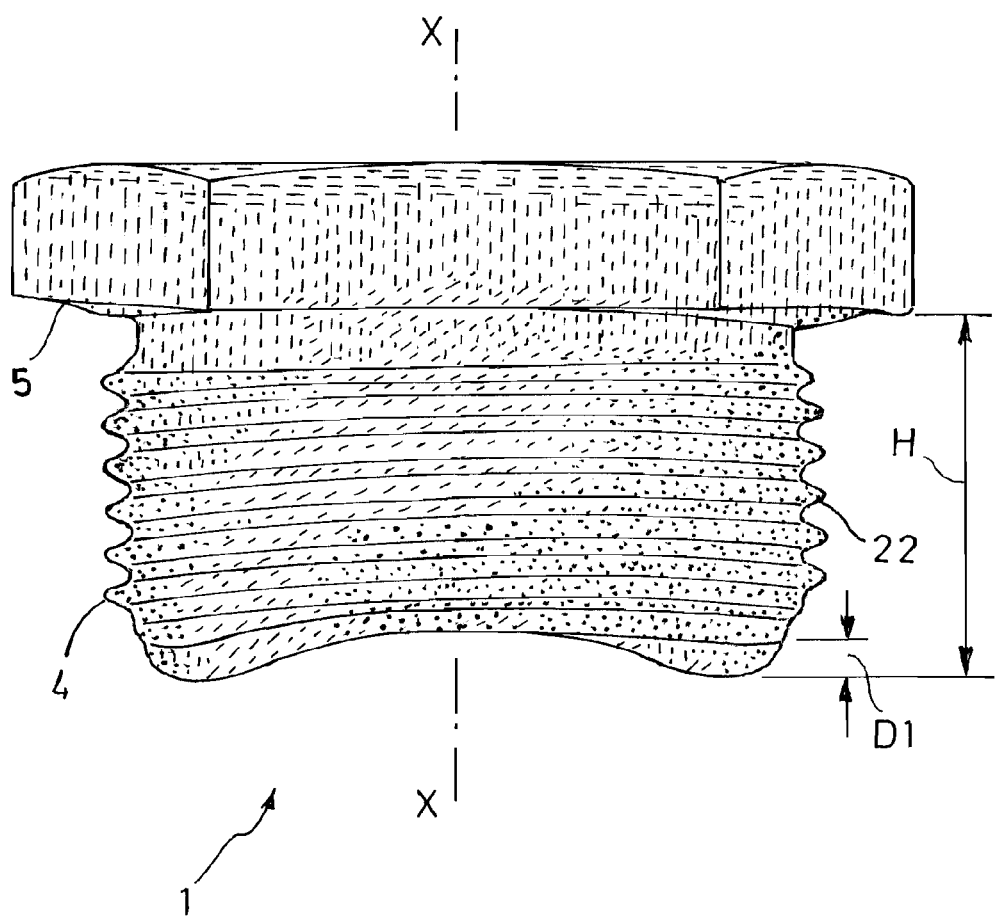
FIG. 16 is an illustration of shrinkage and warping in the longitudinal direction in a molded part according to the present invention of FIG. 2.
Figure 17:
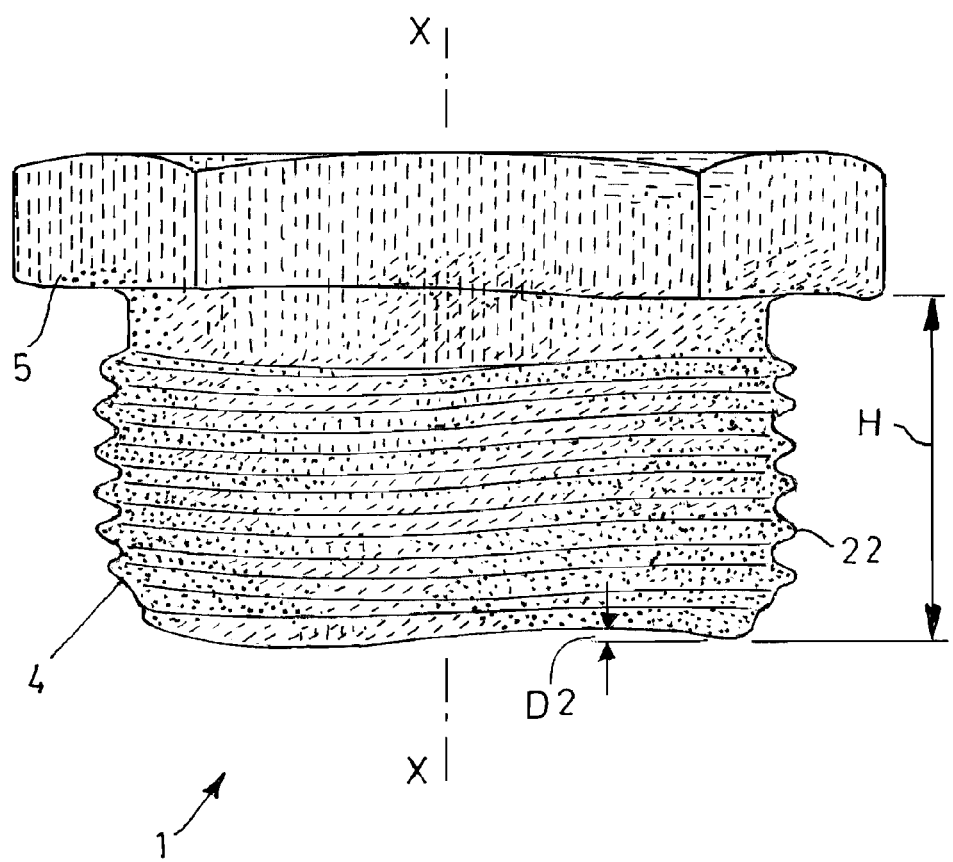
FIG. 17 is an illustration of shrinkage and warping in the longitudinal direction in a molded part according to the present invention of FIG. 3.

A still further advantage of the invention will be explained hereinafter with reference to FIGS. 15 to 17. It has already been mentioned that the volume shrinkage of the molded part 1a, 1 occurring during solidification can be compensated by a holding pressure applied prior to removal. For this purpose, a pressure of approximately 50 MPa with a contact time of approximately 15 s is respectively applied to all molded parts 1a, 1 in the present case. FIGS. 15 to 17 show comparative illustrations of shrinkage and warping in the longitudinal direction X-X in the different molded parts 1a, 1, wherein the shrinkage and warping are shown enlarged 50× for better visualization. The illustrations show that the shrinkage and warping were not smaller in the molded parts 1 according to the present invention than in the molded part 1a produced for comparison. It has, however, been found that the respective differences Da, D1, D2 between the greatest shrinkage and greatest warping decreased with an increasing number of injection openings O1, O2, O3 and were also distributed more homogeneously over the circumference. A warping more homogeneously distributed over the circumference results in better dimensional stability of the molded parts. According to the present invention, molded parts 1 can thus be produced, which not only have an unexpectedly high strength but are also characterized by higher material homogeneity adapted to the practical requirements and counteracting possible damages.

Figure 18:
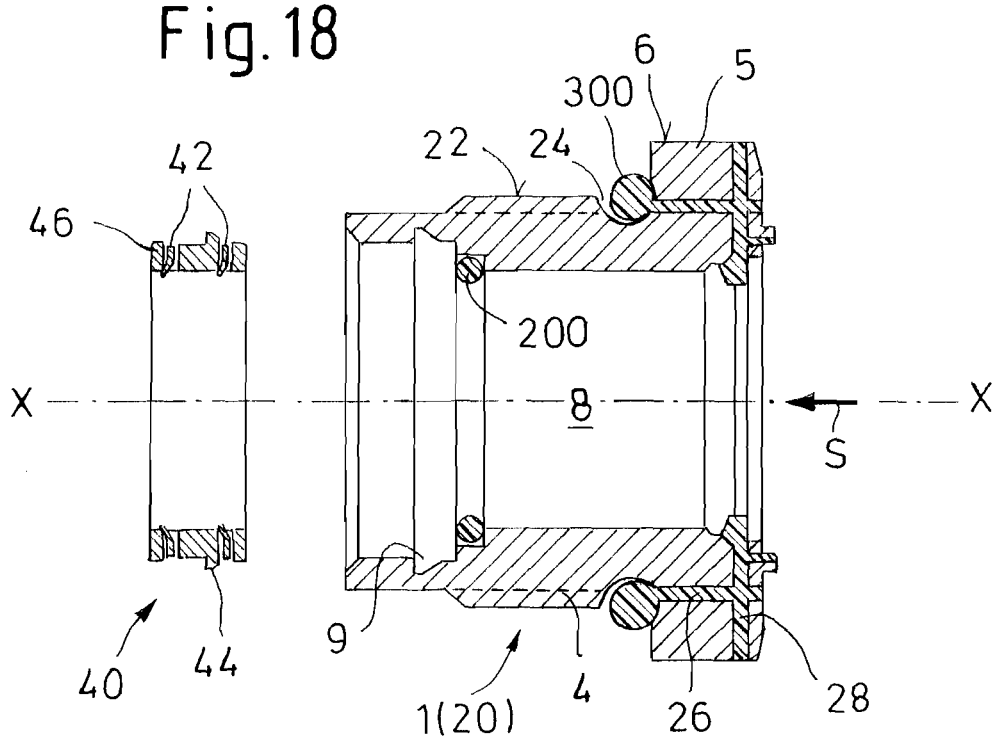
FIGS. 18 and 19 are each longitudinal sections of another embodiment of a molded part according to the present invention and that can be produced with an injection molding method according to the invention.
Figure 19:
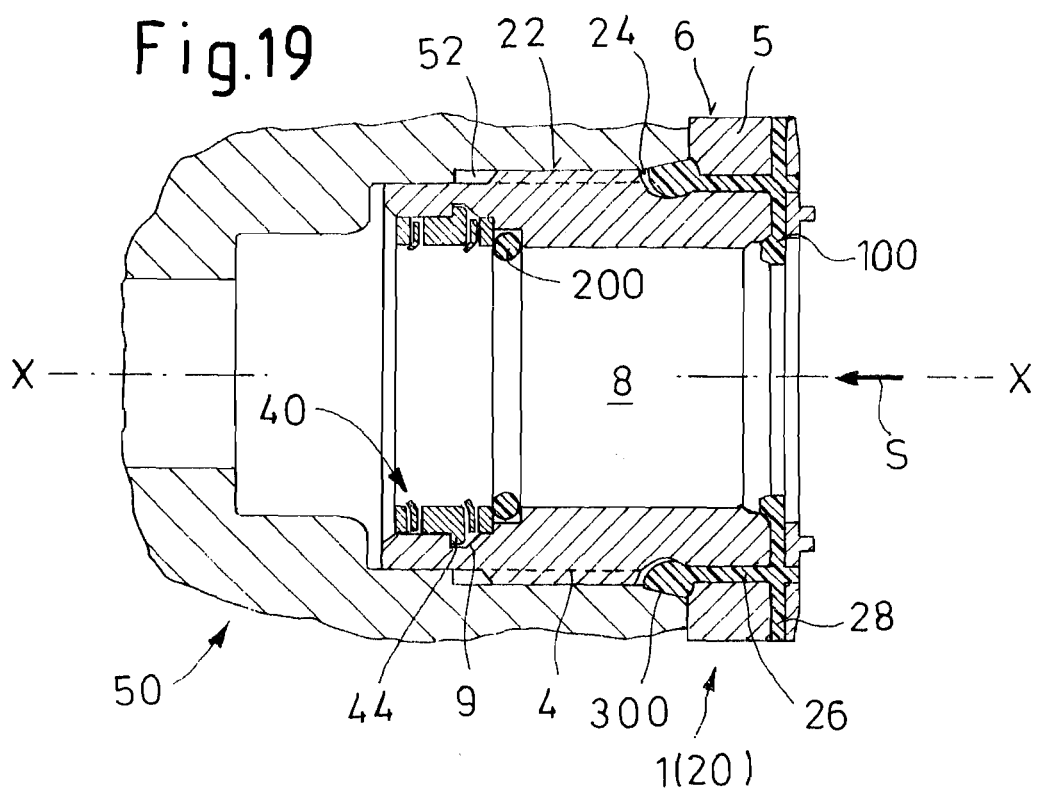

A further embodiment of a molded part 1 according to the present invention illustrated in the longitudinal section in FIGS. 18 and 19 can likewise be produced with an injection molding method according to the invention. The molded part 1 is a connection part of a plug connector for pressure medium systems, which consists of two connection parts, namely of one receiving part 20, which in this case is formed by the molded part 1 according to the present invention, and a plug part, which is not shown. The plug part can be plugged with a plug shaft circumferentially sealed into a receiving opening 8 of the receiving part 20 in the plug direction S and locked into position via a holding element 40 that can be inserted into and/or mounted in a recess 9 of the receiving part 20.

FIG. 18 shows detailed illustrations of the receiving part 20 and the holding element 40 prior to assembly, and FIG. 19 in the assembled state, wherein the receiving part 20 can be screwed via its external thread 22 into another part 50. The internal thread of the part 50 is complementary to the external thread 22 of the molded part 1 and is designated with reference numeral 52.

The plug part 20 can be locked into position in a partially plugged, incompletely sealed, pre-engaged position on the one hand, and in a completely plugged, completely pressure tight, fully engaged position against loosening on the other hand. Locking elements 42 of the holding element 40 respectively engage in a latching edge of the plug part in both locking positions forming a locking connection. A leakage is desirably provided in the pre-engaged position. This state is acoustically perceivable by a leak noise when pressure is applied without the possibility, however, of the occurrence of a complete, sudden pressure drop. The connection can further be moved to the correctly sealed and locked, fully engaged position on occurrence of the leak noise.

The holding element 40 is configured and arranged relatively movable in the recess 9 of the receiving part 20 in such a way that at least in the fully engaged position at least one of the locking elements 42 can be released from the unclosed position by shifting the holding element 40 against the plug direction S, in which the locking connection to the plug part can be canceled, and moved to a closed position in which the elimination of the locking connection can be prevented in a form-fitting manner. For form-fittingly preventing the cancellation of the locking connection, a locking section 44 that interacts with the locking elements is provided which radially engages in the recess 9.

Specifically, the holding element consists of a clamp cage 46 seated in the recess 9 of the receiving part 20 and two locking elements 42 that are radially elastically deformably supported therein and axially arranged consecutively in such a way that the locking edge of the plug part is engaged in the pre-engaged position by the first locking element 42 and in the fully engaged position by the second locking element 42. The clamp cage 46 is configured as an annular body with two, in particular slot-like receiving spaces for the locking elements 42.

A peripheral seal 100, consisting in particular of an elastomer, is provided in the mouth region of the receiving opening 8 of the receiving part 20, which is used as a seal for preventing dirt, dust, moisture or similar from entering the part.

A peripheral seal 200, consisting in particular of an elastomer, is likewise provided in the receiving opening 8 of the receiving part 20, adjacent to the holding element 40, for sealing the plug part in the receiving opening 8 of the receiving part 20.

A third peripheral seal 300, also in particular consisting of an elastomer, is situated on the outer periphery of the receiving part 20, in particular in a groove 24 in an area between the base body 4 and the flange hub 5 of the molded part 1. This peripheral seal 30 is used, as is apparent from FIG. 19, to seal the connection between the receiving part 20 and the rest of the part 50.

In order to ensure that the receiving part 20, including the peripheral seals 100, 200, 300, can be produced in a simple and thus more cost-effective manner with high functional reliability, the receiving part 20 (i.e., the base body 5 and flange hub 5, and at least one of the peripheral seals 100, 200, 300) can be molded from different polymeric materials by means of multi-component injection molding and be combined with one another. As a result, the receiving part can be injected advantageously at least almost completely into a single production machine and/or molded part, whereby the assembly steps of furnishing separately produced seals to be provided according the known prior art can be omitted.

In the method according to the present invention a multi-component injection molding process is provided for the production of a receiving part of this type in which, in the first instance, in a first production step, the molded part 1 is molded from a first polymeric material, as described above, and then one or more seals are molded from a second polymeric material in a second production step, the different polymeric materials forming the components of the multi-component injection molding process. In the present case, two peripheral seals 100, 300 are formed by means of multi-component injection molding, on the one hand the peripheral seal 100, which is used as a seal to prevent dirt, dust, moisture and similar foreign objects from entering the part, and on the other hand the peripheral seal 300, which is used for sealing the connection between the receiving part 20 and the rest of the part 50. By means of the multi-component injection molding process a shaping mandrel, or several shaping mandrels of suitable shapes, can preferably be overmolded.

The advantage of the invention is that by producing one, several or all of the seals 100, 200, 300 with the multi-component injection molding method, several (e.g. adjacent seals of the same material or different materials) can be produced and adhesively bonded to one another and to the receiving part 20, optionally or alternatively in a form-fitting manner with the latter. In this way, as is apparent from FIGS. 18 and 19, axial or radial channels 26, 28 can be formed in the base body 4 and/or in the flange hub 5, which are then filled with the material forming the peripheral seals 100, 300 and connecting the seals 100, 300.

Whereas the receiving part 20 can preferably consist of a fiber-containing thermoplastic or also duroplastic material, the seals 100, 200, 300 should consist of one or several elastomeric material(s), i.e. of a preferably fiber-free and isotropic material such as caoutchouc or thermoplastic elastomers. Especially preferred materials for the seals 100, 200, 300 are fluoride and/or silicone caoutchouc, but also EPDM and/or polyurethane (PUR), such as thermoplastic polyurethane (TPE-U).

Figure 23:
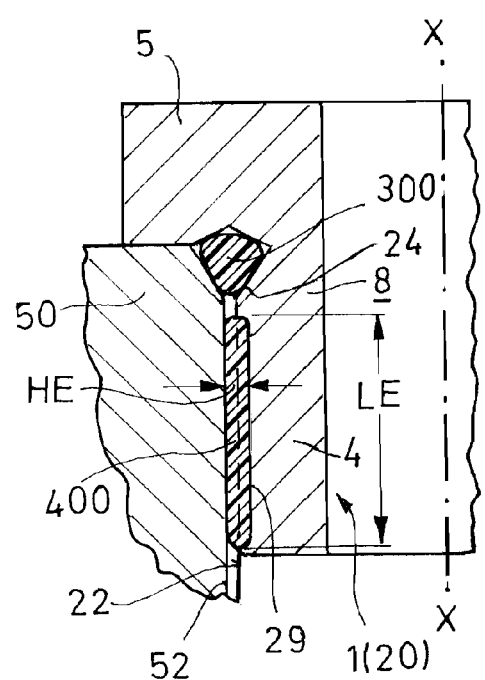

FIG. 20 shows another embodiment of a molded part 1 according to the present invention, configured as a screw part as well as a receiving part 20. The particularity of the embodiment, as well as the embodiment in FIG. 23, is that a special thread lock 400 for the thread 22 is provided with the molded part 1.

Thread locks for screw or screw parts are known per se. In these known thread locks a groove is milled into the thread of the screw body and an elastically deformable string, for example, is pressed into it. The special thread lock 400 for the thread 22 of the molded part 1 according to the present invention is characterized, however, in that unlike the known thread locks, it is not accomplished as a string, but produced as an insert, with a special contour, together with the molded part 1 with the multi-, or in the described case, in particular with the two-component injection molding method. The insert has a length LE which extends over the whole length of the thread 22 in the present case. It could, however, be shorter. The cross section of the insert is essentially rectangular, which, however, is not a restrictive characteristic. The length LE is several times larger than the cross sectional dimensions—height HE, width BE—which in turn are in the range of a height HG of the paths of the thread 22.

Thermoplastic materials such as e.g. unfilled polyamide (PA) can be used for producing the thread lock 400. A material can in particular, however, be advantageously used which has already been described as suitable for the peripheral seals 100, 200, 300.

A groove 29, in particular running axially, for receiving the thread lock 400 is molded in a technologically advantageous manner (without cutting) while injection molding the molded part 1. The groove 29 should have a depth TN which is approximately as large as the height HE of the thread lock 400. Preferably, however, this depth TN is slightly smaller so that the thread lock 400 slightly protrudes over the thread flanks.

Compensatory tolerances of the threads 22, 52, and increased vibration resistance can already be achieved with a single thread lock 400, as well as preventing a release of the screw connection to another part 50 (FIG. 23) in case of dynamic stress. This occurs by producing a clamping effect through elastic deformation of the thread lock 400 when screwing a molded part 1 secured in that way. A clearance between the external thread 22 of the molded part 1 and the internal thread 52 is filled by the thread lock 400 so that it achieves an increased surface pressure between the thread flanks opposing one another.

If necessary, two or more thread locks 400 symmetrically or asymmetrically arranged on the base body of the molded part 1 can be provided for this purpose.

Although a connection of this type can be released any time, the secured connection maintains its reliability even after repeated screwing or unscrewing. This counteracts autonomous loosening or release of the molded part 1 according to the present invention in the operating state.

Figure 22:
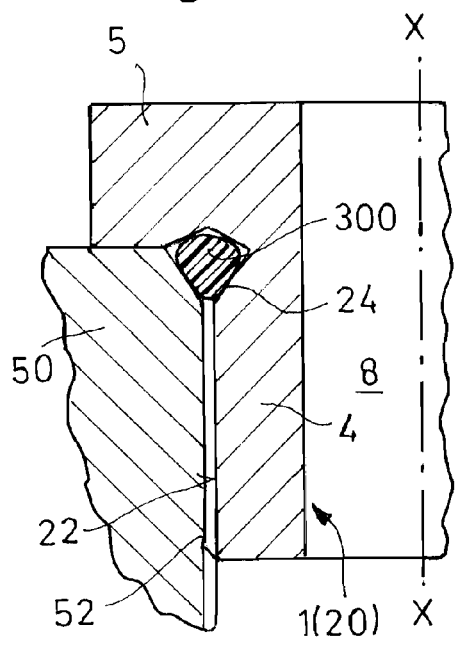
FIGS. 22 to 24 are partial longitudinal sections of other embodiments of a molded part according to the present invention and configured as screw parts.
Figure 24:
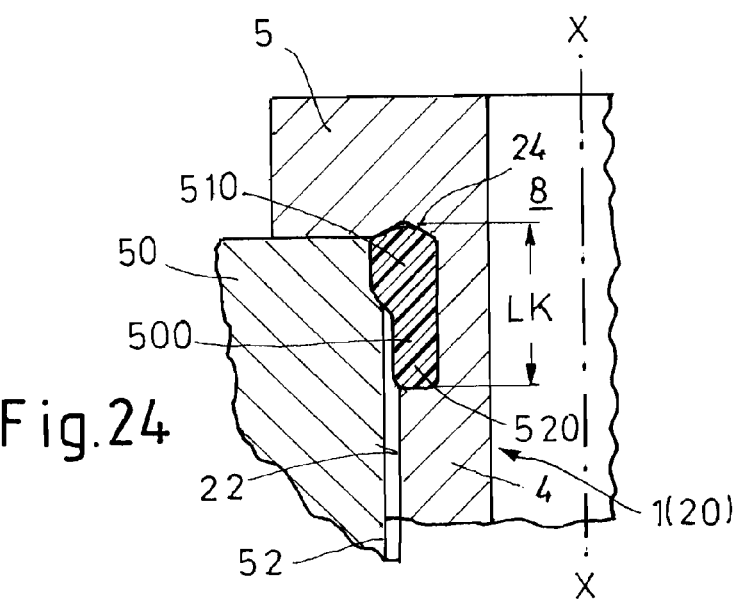

Furthermore, the locking effect as well as the screwing torques of the thread lock 400 can advantageously be adapted to the respective operational requirements on the screw connection. FIG. 21 thus shows a comparison with the loose torques ML of different embodiments of a molded part 1 according to the present invention accomplished as screw parts when a screw connection of the respective molded part 1 to another respectively same part 50 in the individual screw connections is released. Column G1 refers to a molded part 1 without thread lock. Column G2 refers to a molded part 1 with a peripheral seal 300 configured as an O-ring, as illustrated in FIG. 22 and also already described with reference to FIGS. 18 and 19. Column G3 refers to an embodiment, as shown in FIG. 23, i.e. a molded part 1 with a peripheral seal 300 configured as an O-ring as well as with an additional thread lock 400 in particular made of polyamide. Column G4 refers to an embodiment, as shown in FIG. 23 or FIG. 24, wherein the thread lock is a combination part 500 consisting of an O-ring and a thread lock made of an elastomeric material. A specific selection is possible according to a preset target value SW for the loose torque ML, which can for example be between 3 to 4 Nm. Moreover, the loose torque ML can also be adjusted by means of the geometrical dimensions as well as by the type of the arrangement of the thread lock 400 or combination part 500.

The one-piece combination part consisting of an O-ring and a thread lock shown in FIG. 24 is of annular design and has an O-ring section 510 with an approximately circular cross section as well as a cylindrical sleeve section 520 molded onto the O-ring section 510, which in its basic form has a rectangular cross section, as is apparent from the drawing. The sleeve section 520 can also have a slot running in the axial direction X-X. The axial length LK of the combination part 500 can preferably correspond to between two and four times the central diameter of the O-ring section 510, whereby the latter can be selected according to the standard criteria for selecting O-ring cord sizes. The combination part 500 is preferably arranged similarly to the O-ring 300 of the embodiment in FIGS. 18 and 19 in a groove 24 situated with its rear on the flange hub 5 of the molded part 1, whereby a sleeve section 520, which in the mounted state should at least extend over some first (in FIG. 24, upper) paths of the thread 52 of the part 50, is screwed into the molded part 1.

FIGS. 25 and 26 show other embodiments of a molded part 1 according to the present invention, which likewise, similarly to the embodiment in FIGS. 18 and 19 as well as to the above mentioned embodiments, are configured as screw parts with an external thread 22, which on the other hand, however, are also used as receiving parts 20 for creating plug connections. The corresponding plug part is shown in this case and designated with the reference numeral 60. These embodiments also have a lock 600 for the thread connection 22/52 between the molded part 1 and the part 50, into which this molded part 1 is screwed.

The lock 600 differs in its construction and mode of operation from that of the thread lock 400 shown in FIGS. 20 and 23. Whereas the thread lock 400 shown in FIGS. 20 and 23 has a rather static mode of action, the mode of action of each lock 600 of the embodiments according to FIGS. 25 and 25 is dynamic, i.e. during the assembly, the locks 600 are transferred from a passive to an active state, in particular when creating the plug connection between the receiving part 20 and the plug part 60. The active state of the lock 600 is shown in FIG. 25 and the passive state in FIG. 26.

The lock 600 of the embodiments according to FIGS. 25 and 26 is each configured pin-like, whereby the pin-like locking body can in turn consist of an elastically deformable material as well as the above described thread lock 300 or the combination part 500. The lock 600 penetrates a radial opening 30 in the wall 32 of the receiving part 20 and is movably mounted therein. There can be a transition fit so as to prevent the lock 600 from falling out of the radial opening. In this case, the lock 600 has a length LS, which is somewhat larger than the sum of the thickness LW of the wall 32 of the molded part 1 in the area of the bore 30 and of the height HG of the thread 22.

In the passive state, according to FIG. 26, the lock 600 protrudes radially inward into the receiving opening 8 of the receiving part 20. When the plug part 60 is inserted in its plug direction S, the lock 600 is then, however, pressed radially outward over a conical surface 62 of the plug part 60 and thereby functionally activated to increase the loose torque ML. In this connection, it can be preferably provided that the lock is only fully activated once the plug part 60 has reached its final assembly position in the receiving part 20, as is shown in FIG. 25. The active state of the lock 600 is in particular characterized in that in the radial opening 30 the lock 600 is pushed so far outward that it exceeds the height HG of the thread 22 of the receiving part 20 or is at least flush with this height HG. In order to accomplish this, a zone 64 with an enlarged diameter can be accordingly arranged at the plug part 60 which prevents the lock 600 in the radial opening 30 from being again pushed inward when the part 50 is screwed onto the external thread 22 of the molded part 1. Consistent with an optimum interaction with the lock 600 and consistent with an unobstructed mobility of the plug part 60 in the receiving opening 8 of the receiving part 20, the zone 64 with the enlarged diameter of the plug part 60 can likewise preferably consist of an elastically deformable material. In order to provide several points at which the thread is locked, the radial opening 30 and/or also several radial openings 30 can either likewise be inserted during injection molding of the molded part 1 or drilled after injection molding said part.

The invention is not restricted to the illustrated and described exemplary embodiments, but also comprises all identically acting designs consistent with the invention. It is thus possible that the injection is implemented in a different manner than shown, e.g. in the radial direction, or circumferentially, or in a central section of the base body 5.

Furthermore, the person skilled in the art can provide additional advantageous technical measures without abandoning the framework of the invention. In this way, the alignment of the fibers F during injection molding can also be controlled by varying the injection volume. It has been found that at a smaller injection volume the proportion of the fibers F aligned in the flow direction is smaller than at a large injection volume. It has also been found that a similar control effect can be achieved by varying the fiber proportion. It can thus be observed in the range of 15 to 50 percent, mentioned as preferred, that there is a stronger alignment of the fibers, i.e. unidirectionality of the fibers F, with the smaller volume fraction than with the larger volume fraction.

With regard to the exemplary embodiment shown in FIGS. 18 and 19, the basic design of a plug connector as described above, however without parts produced by means of the multi-component injection molding method, is known from EP 0 913 618 B1. With regard to further details, which can be provided in the last described embodiment of the invention, reference is therefore made to this document in its entirety. Kinematic reversal is thus, for example, possible in such a way that in both locking positions the locking elements 42 of the holding element 40 also engage in a locking edge of the other receiving part 20 by creating a locking connection, wherein the holding element 40 is configured and arranged relatively movable in a recess of one of the plug parts in such a way that the above described locking processes can take place.

Independent inventive importance is given to the embodiments of the molded part 1 having the parts 400, 500, 600, which are used to increase the loose torque ML.

Furthermore, the invention is not restricted to the combination of characteristics defined in claims 1 and 31, but can also be defined by any other combination of certain characteristics of all disclosed individual characteristics. This means that basically each individual characteristic of the independent claims may virtually be omitted and/or replaced by at least one individual characteristic disclosed at another point of the application. To this extent, the claims are to be merely understood as a first attempt at formulating the invention.

The invention claimed is:

1. A method for producing a molded part with a rotationally symmetrical or at least partially annular cross-section, the method comprising the steps of injecting a plasticized polymeric mass (PM) containing fibers (F) through at least two injection openings (O1, O2, O3) into at least one annular cavity (K) of a molding tool to form a screw part having a base body shaped as a hollow cylinder with an internal thread and an external thread thereon and defining a longitudinal axis, and once the polymeric mass (PM) has solidified into the screw part, the screw part is removed from the molding tool, wherein the plasticized polymer mass (PM) has a fiber content by volume in a range of 2.5 through 60 percent, wherein the fibers (F) have an average length in a range of 0.1 through 1.5 mm, and wherein the polymer mass (PM) fills the cavity (K) by simultaneously flowing out of each of the injection openings (O1, O2, O3) in an axial direction (X-X) of the molded part and toward two sides in a circumferential direction so that that the fibers (F) are aligned during injection predominantly in both main stress directions of axial tension (Z) and torsion (T) throughout the screw part, the fibers including a first proportion being aligned in a circumferential direction at right angles to the longitudinal axis being less than fifty percent of all of the fibers, the fibers also including a second proportion of the fibers being aligned in a direction parallel to the longitudinal axis and being less than fifty percent of all of the fibers.

2. The method according to claim 1, wherein the injection into the cavity takes place through two injection openings (O1, O2) which are situated diametrically opposite from one another or through three injection openings (O1, O2, O3) that are circumferentially offset from one another by 120° on the annular cross-section of the screw part.

3. A method according to claim 1, wherein the plasticized polymeric mass (PM) is a plastic material which forms a thermoplastic matrix (M) of the screw part.

4. The method according to claim 1, wherein the screw part includes a base body of one of a round, trilobular and polygonal hollow cylinder, the base body further having a radially flared flange hub located on an end side thereof.

5. A method according to claim 1, wherein the at least two injection openings (O1, O2, O3) are arranged toward one end of the screw part-at the radially flared flange hub and that the injection takes place through the injection openings (O1, O2, O3) in an axial direction (X-X).

6. A method according to claim 1, wherein at least one of inner recesses, outer recesses, inner steps or outer steps, are configured in the screw part.

7. A method according to claim 1, wherein isotropic fibers (F) or anisotropic fibers (F) are used as fibers (F).

8. A method according to claim 1, wherein the fibers (F) have an average diameter in the range of approx. 3 µm to 35 µm.

9. A method according to claim 1, wherein by means of multi-component injection molding, the screw part is adhesively or form-fittingly connected to other parts, like peripheral seals and/or parts, which, when there is a screw connection of the molded part with another part, are used to increase the loosening torque (ML) of the screw part.

* * * * *